United States Patent
Chan (10) Patent No.: US 10,392,557 B2
(45) Date of Patent: Aug. 27, 2019

(54) MULTI-DYE MICROPARTICLES

(71) Applicant: DNA Medicine Institute, Inc., Cambridge, MA (US)

(72) Inventor: Eugene Y. Chan, Boston, MA (US)

(73) Assignee: DNA Medicine Institute, Inc., Cambridge, MA (US)

( * ) Notice: Subject to any disclaimer, the term of this patent is extended or adjusted under 35 U.S.C. 154(b) by 332 days.

(21) Appl. No.: 14/682,031

(22) Filed: Apr. 8, 2015

(65) Prior Publication Data

US 2015/0362499 A1    Dec. 17, 2015

Related U.S. Application Data

(60) Provisional application No. 61/977,047, filed on Apr. 8, 2014.

(51) Int. Cl.
| | | |
|---|---|---|
| C09K 11/06 | (2006.01) | |
| C08F 222/10 | (2006.01) | |
| C08F 2/44 | (2006.01) | |
| C09K 11/02 | (2006.01) | |
| C08F 220/36 | (2006.01) | |
| C08F 220/30 | (2006.01) | |

(52) U.S. Cl.
CPC ............. *C09K 11/06* (2013.01); *C08F 2/44* (2013.01); *C08F 222/1006* (2013.01); *C09K 11/02* (2013.01); *C08F 220/36* (2013.01); *C08F 2220/301* (2013.01); *C08F 2220/303* (2013.01); *C08F 2222/1013* (2013.01); *C09K 2211/1011* (2013.01)

(58) Field of Classification Search
None
See application file for complete search history.

(56) References Cited

PUBLICATIONS

Shibata et al (2010 PNAS 107:17894-98).*
Hwang et al (2009 JACS 131:4499-504).*
Hwang et al (2009 JACS 131:4499-504 supporting information).*

* cited by examiner

*Primary Examiner* — Christopher M Gross
(74) *Attorney, Agent, or Firm* — Danielson Legal LLC (57) ABSTRACT

The stable and precise incorporation of multiple fluorescent dyes into hydrogel microparticles. The multiple fluorescent dyes, excited with the same source, have distinct fluorescence emission spectra to enable identification of the microparticles. The fluorescent molecules are directly polymerized into the hydrogel matrix or stably incorporated through molecular entanglement. By changing the molar ratios of the fluorescent dyes, different and identifiable microparticles can be synthesized.

18 Claims, 6 Drawing Sheets

MULTI-DYE MICROPARTICLES

CROSS-REFERENCE TO RELATED APPLICATIONS

The present application claims the benefit of U.S. provisional application No. 61/977,047, filed on Apr. 8, 2014, the entire disclosure of which is incorporated by reference as if set forth in its entirety herein.

FIELD

The invention relates generally to multi-dye microparticles and, in particular, to fluorescent hydrogen microparticles and methods of making the same.

BACKGROUND

Microspheres are utilized widely for biological assays. Fluorescent dyes can be utilized for multiplexing and identification of microspheres from one another. It is well known that fluorescent dye from these microspheres leaches out from the microspheres over time. This leads to a decrease in fluorescent intensity as well as an increase in background fluorescence. Loss of accuracy, especially in measurement of MESF (Molecules of Equivalent Soluble Fluorochrome), is undesirable. Loss of fluorescence over time can change the quantitative level of fluorescent dye in the microspheres and therefore lead to errors.

One standard method of staining microspheres is by swelling the particles and incorporating the fluorescent dye in a non-covalent manner. This leads to dye leaching over time. For instance, an oil-soluble dye in solvent mixed with copolymer particles can be utilized with hydrophobic microspheres. During the swelling process, the microparticles have increased pore sizes, thus allowing permeating of fluorescent dye into the matrix. The solvent type, time, and temperature controls the level of swelling. Removal of the solvent reverses the process and traps the fluorescent dye in the matrix. This mixing leads to staining of the microspheres, but there is tendency of the dyes to leach out over time. Although there are hydrophobic type interactions, the use of amphiphilic detergents in bead mixtures facilitates this leaching process.

Methods to covalently attach fluorophores to the surface of polymeric microspheres are also known. Furthermore, the abundance of commercially-available microspheres makes this approach standard to one skilled in the art. However, surface labeling is not desirable because only a limited amount of fluorescent dye can be incorporated in this manner.

It is therefore highly desirable to have microparticles for bioassay purposes that have fluorescent molecules that are stable and do not leach out over time, permitting these microparticles to be identified by their fluorescence signature.

SUMMARY

Embodiments of the present invention concern the internal, copolymerization of fluorescent dyes into hydrogel microparticles. These dyes are covalently incorporated or copolymerized as a large chain, molecularly entangled polymer into hydrogel microparticles to form stable fluorescent microparticles. These types of fluorescently stained microparticles have numerous advantages over polymeric microspheres because they have no dye leaching and also have all the advantages of hydrogels, including a greater internal surface area, low background autofluorescence, and low non-specific binding.

Furthermore, the more spectral colors within the particles, the more readily they can be identified from one another. The chemistry of hydrogel microparticles prevents the use of microparticle swelling techniques for dye incorporation. This is due to the nature of the hydrogel substrate, which by definition, is porous and holds water. Furthermore, hydrogels are hydrophilic and therefore less likely to bind hydrophobic dye molecules. Alternate methods of dye incorporation are therefore required, leading to stable fluorescence incorporation and lack of dye leaching. In this manner, the microparticles can retain their fluorescence attributes over time. The end result is hydrogel microparticles that can be identified by two or more spectrally distinct fluorescence colors. These particles have all the advantages of hydrogel-based particles and improved dye stability over conventional swelling-based dyed microparticles.

In one aspect, embodiments of the present invention relate to a method for manufacturing fluorescing hydrogen microparticles, the method including adding at least two fluorescent dyes to a hydrogel prepolymer mixture; mixing the mixture; and applying ultraviolet light to a portion of the mixture to form a polymerized microparticle.

In one embodiment, the method further includes washing the polymerized microparticle to remove unpolymerized monomers. In one embodiment, at least one of the at least two fluorescent dyes has a functional polymerizable group that is compatible with the prepolymer mixture. In one embodiment, at least one of the at least two fluorescent dyes is preconjugated to a high molecular weight molecule prior to addition to the prepolymer mixture. In one embodiment, the at least two fluorescent dyes are stably incorporated in the hydrogel prepolymer mixture.

In one embodiment, the at least two fluorescent dyes are excitable by a single excitation source. In one embodiment, the fluorescence emissions of the at least two fluorescent dyes are distinct. In one embodiment, the ratio of the at least two fluorescent dyes is selected to provide a signature for identifying the microparticle.

In one embodiment, the method further includes generating microfluidic droplets from the mixed solution. In one embodiment, the method further includes generating at least one polymerized microparticle using stop-flow lithography. In one embodiment, the method further includes generating at least one polymerized microparticle using continuous-flow lithography. In one embodiment, the method further includes generating at least one polymerized microparticle using a slide-based fabrication process.

In another aspect, embodiments of the present invention relate to a microparticle. The microparticle comprises a hydrogel body and at least one fluorescent dye dispersed throughout the entirety of the hydrogel body.

In one embodiment, the microparticle comprises at least two fluorescent dyes dispersed throughout the entirety of the hydrogel body. The quantities of the at least two fluorescent dyes may be fixed in a predetermined ratio. The at least two fluorescent dyes may be excitable by a single excitation source. The at least two fluorescent dyes may have distinct fluorescence emissions.

In one embodiment, the at least one fluorescent dye has a functional polymerizable group that is compatible with the hydrogel. In one embodiment, the at least one fluorescent dye is conjugated to a high molecular weight molecule. In one embodiment, the hydrogel body is elongated.

The foregoing and other features and advantages of the present invention will be made more apparent from the descriptions, drawings, and claims that follow. One of ordinary skill in the art, based on this disclosure, would understand that other aspects and advantages of the present invention exist.

BRIEF DESCRIPTION OF DRAWINGS

In the drawings, like reference characters generally refer to corresponding parts throughout the different views. The drawings are not necessarily to scale, emphasis instead being placed on the principles and concepts of operation.

DETAILED DESCRIPTION

Hydrogel microparticles are highly biocompatible and have numerous advantages over conventional polymeric (polystyrene, latex, etc.) beads. For instance, polyethylene glycol (PEG) microparticles have low autofluorescence, are porous, have low non-specific binding, and can have different functionalities. In particular, PEG with reactive acrylate groups can be utilized to form hydrogel particles using ultraviolet (UV) exposure. PEG microparticles thus have desirable attributes for biological applications.

Embodiments of the invention concern hydrogel microparticles that have two or more distinct and stably incorporated fluorescent dyes. In contrast to conventional polystyrene and latex microspheres, which utilize swelling-based approaches to dye incorporation, the hydrogels described here have minimal to no leaching of the dyes over time. This approach leads to longer microparticle stability and also fluorescent signatures that remain constant with the microparticle over time. Sets of the hydrogel microparticles can be fabricated and utilized in multiplexing applications or they can be utilized individually in mixed sample assays. Overall, this approach represents an advance over the existing art because these particles have low autofluorescence, low non-specific binding, large 3D surface area, and a stably incorporated fluorescence signature.

Embodiments of the invention also concern the fabrication of hydrogel-based microparticles that have two or more spectrally distinct fluorescent dyes in them for coding and identification. The fluorescent dyes are stable over time in the hydrogel and do not leach out, unlike dyes fabricated from swelling-based techniques. By varying the ratios of these fluorescent dyes, various combinations of identifiable particles can be fabricated. The end result is hydrogel microparticles that retain their characteristics over time and have a longer storage shelf-life than conventional polystyrene or latex microparticles. Furthermore, these microparticles have distinct bioassay advantages over conventional microspheres because they have lower autofluorescence and non-specific binding.

In one embodiment, fluorescent dyes are directly incorporated into hydrogel prepolymer mixes prior to microparticle synthesis. This allows a uniform distribution of the fluorescent molecules in the final polymerized particle. This is in contrast to surface coupling fluorescent dyes to the hydrogel microparticles, which have fewer sites for fluorophores than the 3D hydrogel matrix. In addition, surface coupling can compete away binding sites for capture biomolecules in biological assays.

In order for the fluorescent dyes to be stably incorporated into the microparticles during synthesis, the dyes either need to be covalently-linked to the matrix or they need to pre-conjugated to a high molecular weight (HMW) molecule and then constrained in the matrix. In the case of covalent linkage, the fluorescent molecule needs to have a functional polymerizable group that is compatible with the rest of the prepolymer mixture. In the case of polyethylene glycol diacrylate (PEGDA) microparticles, a corresponding acrylate group on the fluorescent molecule is required. There can be a PEG spacer between the acrylate group and the fluorescent molecule to increase its overall solubility.

Figure 1:
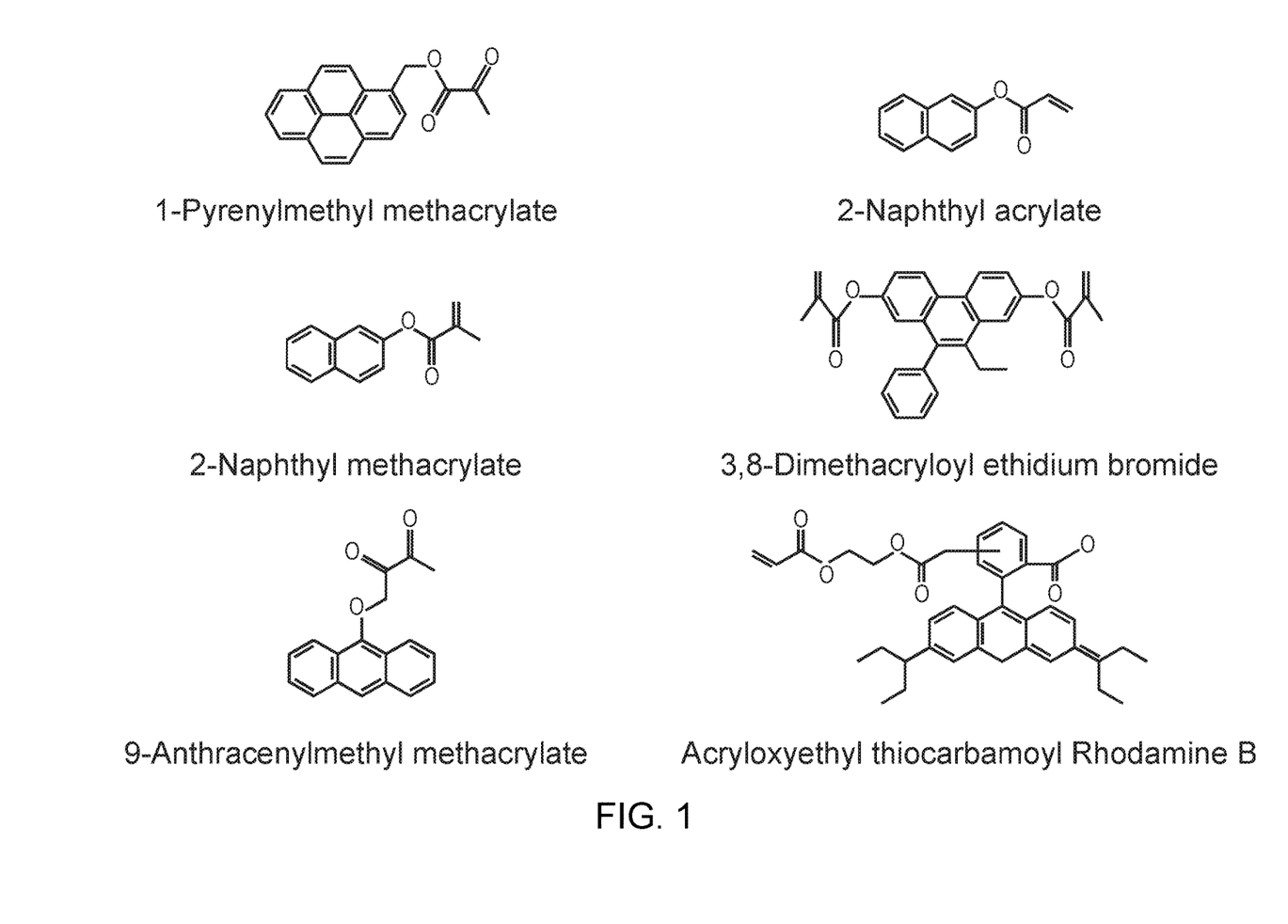
FIG. 1 shows the chemical structure of various acrylate-modified fluorescent dyes used in various embodiments of the present invention.

FIG. 1 shows the chemical structure of various acrylate-modified fluorescent dyes suitable for use with the present invention: 1-pyrenylmethyl methacrylate, 2-napthyl acrylate, 2-naphthyl methacrylate, 3,8-dimethylacryloyl ethidium bromide, 9-anthracenylmeth methacrylate, acryloxyethyl thiocarbamoyl Rhodamine B.

Figure 2:
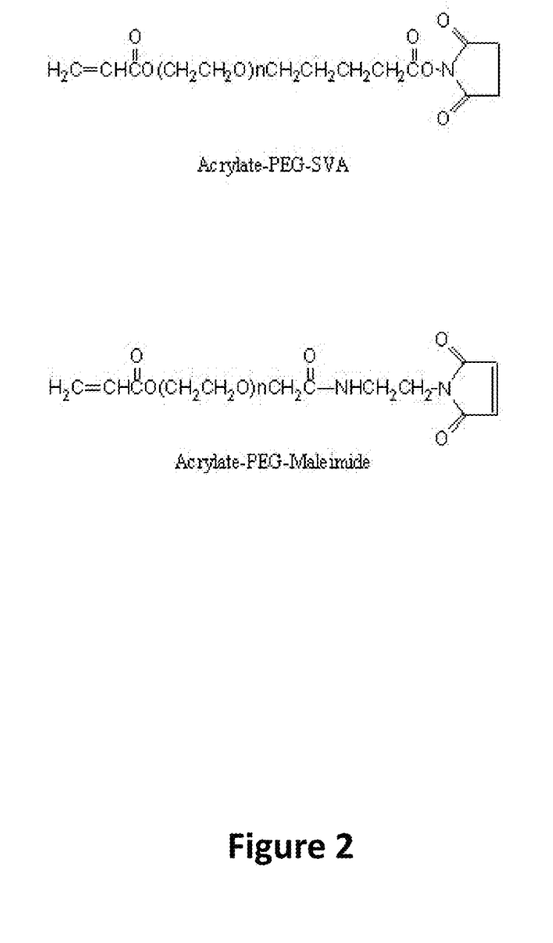
FIG. 2 shows the chemical structure of two heterobifunctional crosslinkers utilized to synthesize acrylate-PEG-fluorophore molecules in accord with certain embodiments of the present invention.

FIG. 2 shows the chemical structure of two heterobifunctional crosslinkers utilized to synthesize acrylate-PEG-fluorophore molecules. The first is acrylate-PEG-succinimidyl valerate and the second is acrylate-PEG-maleimide.

Figure 3:
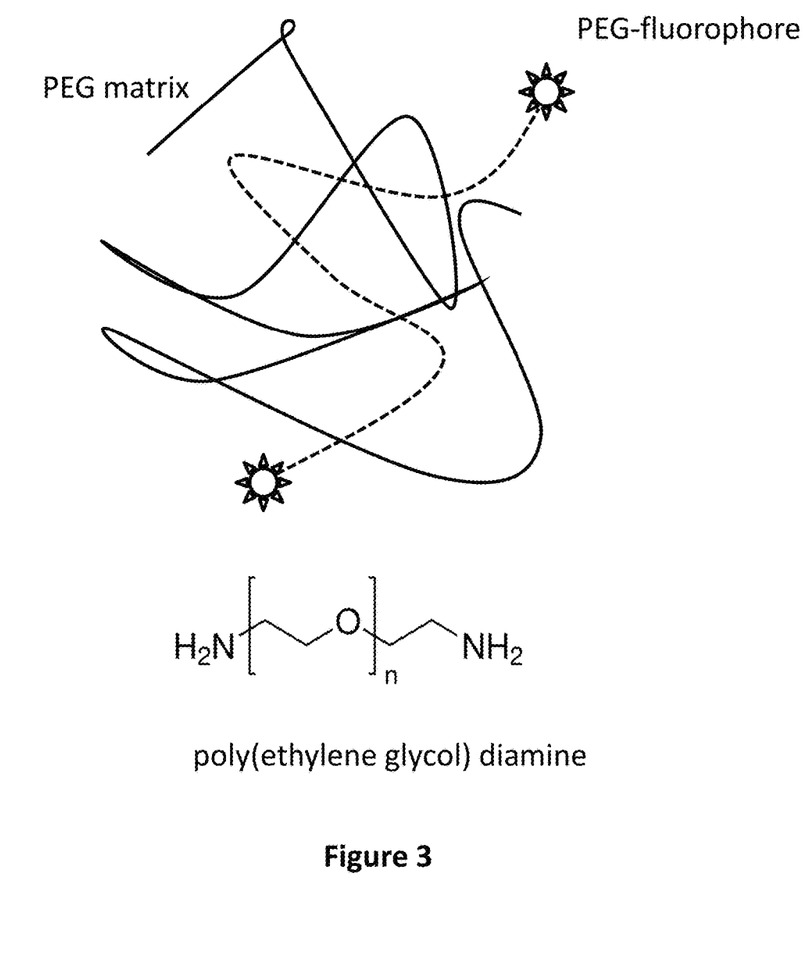
FIG. 3 shows the entanglement of a long chain PEG-fluorophore polymer within a hydrogel matrix in accord with certain embodiments of the present invention.

Fluorescent dyes can be conjugated to long-chain polymers such as PEGs, dextrans, nucleic acids, and other biocompatible long-chain polymers, as illustrated in FIG. 3. These HMW molecules not only decrease the diffusion rate of the molecules, but also allow them to be entangled into the pores of the polymerized mixture. The use of PEG-conjugated fluorescent dyes can improve their solubility and improve the overall uniformity of the fluorescent microparticles. Two or more fluorescent dyes can be pre-conjugated to the same molecule prior to incorporation. This approach can lead to further control over the precise ratios of fluorescent dyes.

In one embodiment, the fluorescent dyes are excitable with a single excitation source and fluoresce at two different spectrally distinguishable wavelengths. The use of the single excitation source permits ratiometric analysis of the two dyes for identification of the microparticles. The use of two different excitation sources is not ideal since each source has variability and may be different with the starting up of each instrument. Two light sources, each with 1% variability, can lead to a total change of 2% between the two bead populations. The use of a single light source removes this variability.

Dye selection, therefore, is significant in this embodiment since both dyes being incorporated into the hydrogel microparticle need to be excited together. One of the desired readouts is via flow cytometry, which utilizes lasers. This narrows the selection of dyes to those with similar excitation spectra and differing emission spectra. The Stokes shift is the spectral distance in nm from the excitation maximum to the emission maximum. The two dyes should have different Stokes shift to accommodate for the similar excitation and differing emission.

There are additional considerations for the fluorescent dyes. First, the level of spectral emission overlap should be minimized. In the event that this cannot be avoided, then fluorescence compensation should be implemented in software to correct for this. Second, the fluorescent dyes should not interfere with the downstream biological reaction and therefore should not have any undesirable functional groups that can react with other biological molecules. Third, the fluorescent dyes should not aggregate in solution during the prepolymer stage of the reaction mixture. This means that the dyes need to be in the appropriate solvent condition such that they can be then dissolved into a hydrogel-based environment. The molar extinction coefficient, photobleaching rate, and quantum yield of the fluorophores should also be optimized. These affect the brightness and stability of the fluorescent dyes.

By having two or more fluorescent dyes stably linked or embedded in the hydrogel matrix, it is possible to vary the ratios between the dyes so that distinct and identifiable populations of microparticles can be fabricated. For instance, using a flow cytometer on one fluorescent channel, up to eight different cell or bead population intensities can be resolved. The addition of one or two additional fluorescent channels for hydrogel microparticle identification can lead to 64- or 512-fold particle identification.

In practice, tens of bioassays are routinely multiplexed and anything more requires time for assay optimization since each test needs to be individually assessed. In addition to creating multiplexed microparticles, a unique spectral signature allows for performing mixed cell and microparticle assays. This involves simultaneously reading out both cells and microparticles in the same mixture. Since the cells can be stained differently, microparticles that have unique and identifiable signatures will be distinctly analyzed. Furthermore, microparticles with two or more dyes can include additional shape-based features to further increase the level of multiplexing. For instance, a microparticle set can be made with varying levels of two dyes and different lengths, as discussed in a co-pending application, "Microparticle Multiplexing," filed contemporaneously herewith, bearing docket no. DNM-107, and hereby incorporated by reference as if set forth in its entirety herein.

Figure 4:
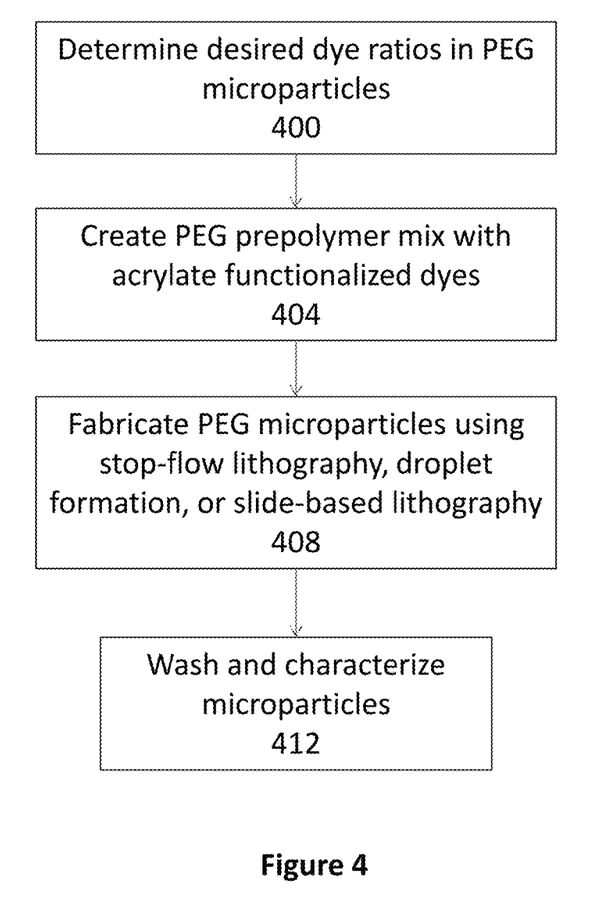
FIG. 4 is a flowchart of a process for fabricating ratiometric hydrogel PEG microparticles in accord with the present invention.

FIG. 4 depicts the steps in one embodiment of a process for manufacturing microparticles in accord with the present invention. The desired dye concentrations and ratios are determined (Step 400). The PEG prepolymer mixture with the acrylate-functionalized dyes is created (Step 404). The PEG microparticles are fabricated (Step 408). The microparticles are washed and characterized (Step 412).

Exemplary Embodiments

In one embodiment, two acrylate functionalized fluorescent molecules are selected. It is desirable that the fluorescent molecules can be excited with a single excitation source so that fluctuations in the light sources wilt be identical in the two detection channels. For instance, two fluorophores that can be excited by a single laser are preferred. The fluorescence emission of the two fluorophores should be distinct. For instance, Pacific Blue (410 nm/455 nm, Life Technologies, CA) and Pacific Green (411 nm/510 nm, Life Technologies) are dyes that meet these criteria. A third dye, Pacific Orange (400 nm/551 nm, Life Technologies), can be added for three-color ratiometric measurements. With 5 populations per dye, there can be $5^3=125$ distinct combinations.

In order for these fluorescent molecules to be stably incorporated into the PEG matrix, they are functionalized with acrylate functional groups. These fluorescent dyes are typically provided with an amine-reactive succinimidyl ester. These are reacted with acrylate-PEG-NH$_2$ molecules (Nanocs, N.Y.). The reaction should be performed in an equimolar 1:1 ratio of fluorophore to acrylate-PEG-NH$_2$ at concentrations between 0.1-1000 M in 0.1-0.2 M sodium bicarbonate buffer, pH 8.3. The fluorescent dye is dissolved in a small amount of DMSO (10 µL) prior to mixing with the PEG in sodium bicarbonate buffer. The reaction is incubated at room temperature for 1 hour and then stopped with 1.5 M hydroxylamine, pH 8.5. The free dye is removed using gel filtration with the appropriate molecular weight cutoff.

A PEG prepolymer mixture is made with 10-90% poly(ethylene glycol) diacryate (PEGDA, MW 770, Sigma Aldrich), 1-10% 2-hydroxy-2-methyl-1-phenyl-propan-1-one photoinitiator, 1-100 µM acrylate-PEG-Pacific Blue, 1-100 µM acrylate-PEG-Pacific Green, and optionally 1-100 µM of acrylate-PEG-Pacific Orange. The remaining volume is filled with distilled water. The molar ratio of Pacific Blue to Pacific Green provides the ratiometric code color for microparticle identification. Similarly, the ratios to a third color, Pacific Orange, can provide further multiplexing. Any two of the three fluorophores can be utilized for ratiometric analysis. The fluorescent molecules are covalently linked to the hydrogel matrix through polymerization of their PEG-coupled acrylate groups.

After the ingredients are added together, the solution is vortexed vigorously to ensure good mixing. This mixture is then utilized for the UV polymerization reaction. After the particles are synthesized, the particles are pelleted by low-speed centrifugation at 2000 rpm and washed and resuspended in the buffer of choice. The washing ensures the particles are free of unpolymerized monomers, both labeled and unlabeled.

In another embodiment, two acrylate functionalized fluorescent molecules are selected, each having a distinct fluorescence excitation and emission spectra. For instance 3,8-dimethacryloyl ethidium bromide has excitation/emission maxima of 439 nm/512 nm. A separate dye that has a different spectra is methacryloxyethyl thiocarbamoyl rhodamine B having an excitation/emission maxima of 548 nm/570 nm. The samples are excited with a broadband HBO mercury arc lamp with the appropriate dual-band excitation filters. The single excitation source allows for proper measurement of the fluorescence in a ratiometric manner from each of the fluorophores. These fluorophores have an acrylate group for direct incorporation into the acrylate matrix. These fluorophores lack the PEG linker between the fluorophore and the acrylate group and hence may have lower solubility than fluorophores with a PEG linker.

These dyes are photopolymerized into the PEG matrix as previously described, using a similar PEG prepolymer mixture. In brief, a PEG prepolymer mixture is made with 10-90% poly(ethylene glycol) diacryate (PEGDA, MW 770, Sigma Aldrich), 1-10% 2-hydroxy-2-methyl-1-phenyl-propan-1 -one photoinitiator, 1-100 µM 3,8-dimethacryloyl ethidium bromide, and 1-100 µM methacryloxyethyl thiocarbamoyl rhodamine B. The remaining volume is filled with distilled water.

After the ingredients are added together, the solution is vortexed vigorously to ensure good mixing. This mixture is then utilized for the UV polymerization reaction. After the particles are synthesized, the particles are pelleted by low-speed centrifugation at 2000 rpm and washed and resuspended in the buffer of choice. The washing ensures the particles are free of unpolymerized monomers, both labeled and unlabeled.

In another embodiment, the various fluorophores can be stably incorporated into the hydrogel matrix without covalent attachment. This is possible through the attachment of fluorophores to long chain PEG molecules. For instance, polyethylene glycol diamine (MW=10,000, Sigma Aldrich) can be utilized to increase the molecular weight and solubility of attached fluorophores. 10 mg PEG diamine is dissolved in 1 mL of 0.1 M sodium bicarbonate buffer. The Pacific Blue succinimidyl ester is dissolved in DMSO at 10 mg/mL. While stirring the PEG diamine solution, 50-100 µL Pacific Blue succinimidyl ester is added. The reaction is incubated at room temperature with continuous stirring. The reaction is stopped by adding 0.1 mL, of freshly prepared 1.5 M hydroxylamine, pH 8.5 and incubated for one hour at room temperature. The conjugate is purified from any unreacted free dye by gel filtration of the appropriate molecular weight cutoff.

The fluorescently labeled, long-chain PEG molecules are stably incorporated into the hydrogel matrix through direct polymerization. Although the PEG molecules are not directly covalently-linked to the matrix, the long chain nature of the PEG molecules causes molecular entanglement and thus a stable incorporation into the hydrogel matrix. The longer the PEG molecule, the less likely the molecule is to diffuse out of the hydrogel matrix. The PEG prepolymer mixture is made with 10-90% polyethylene glycol diacryate (PEGDA, MW 770, Sigma Aldrich), 1-10% 2-hydroxy-2-methyl-1-phenyl-propan-1-one photoinitiator, 1-100 µM Pacific Blue-PEG-Pacific Blue, and 1-100 µM Pacific Green-PEG-Pacific Green. Other types of fluorophores can be utilized as tong as they match the spectral criteria outlined. The remaining volume is filled with distilled water.

After the ingredients are added together, the solution is vortexed vigorously to ensure good mixing. This mixture is then utilized for the UV polymerization reaction. After the particles are synthesized, the particles are pelleted by low-speed centrifugation at 2000 rpm and washed and resuspended in the buffer of choice. The washing ensures the particles are free of unpolymerized monomers, both labeled and unlabeled.

Figure 5:
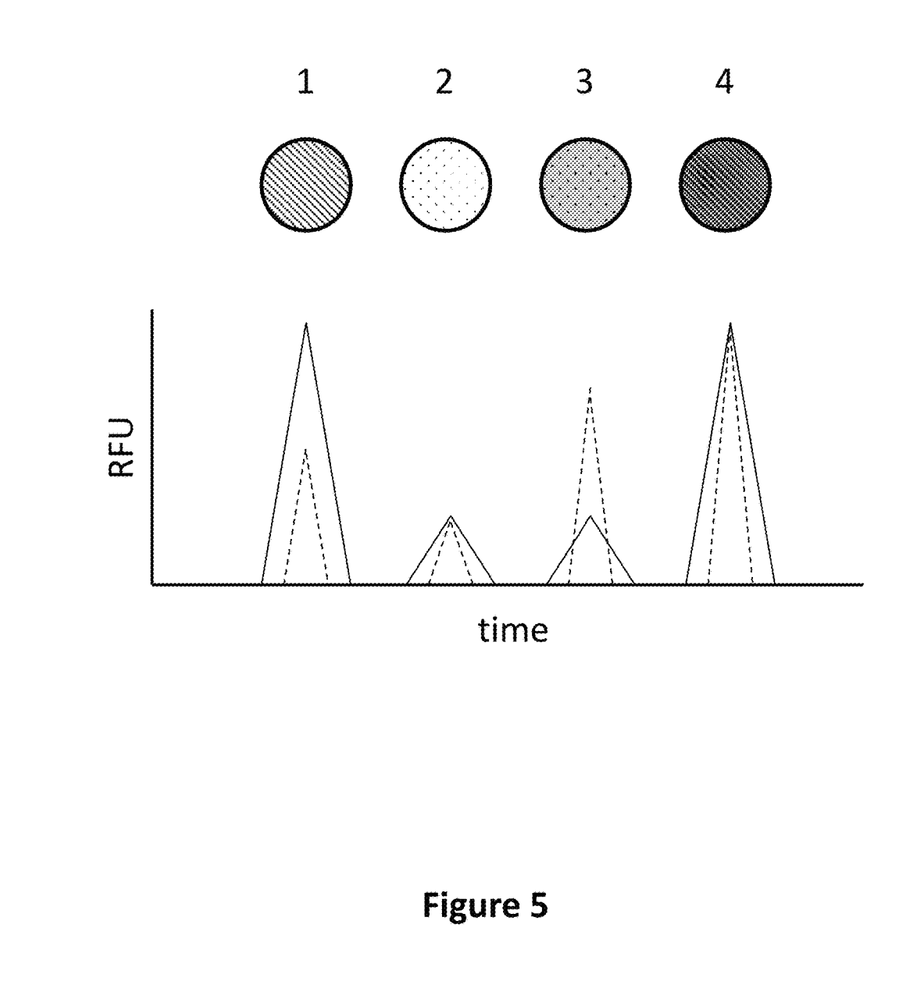
FIG. 5 shows the relative fluorescence units (RFUs) versus time data trace of the ratiometric hydrogel microspheres.
Figure 6:
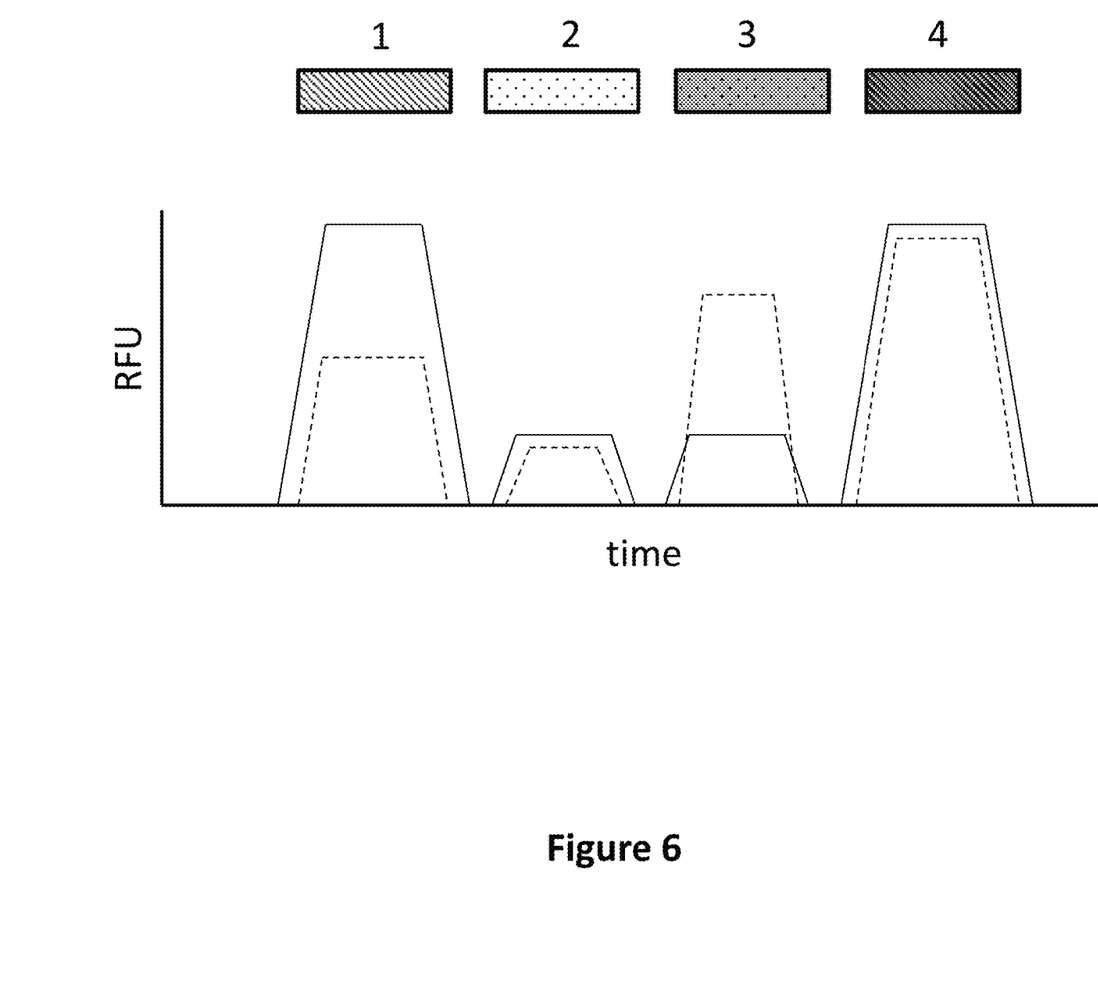
FIG. 6 shows the RFUs versus time data trace of ratiometric rectangular hydrogel microparticles.

In all of these examples, microparticles with various ratios of fluorescent dyes can be synthesized. In this manner, each microparticle is uniquely identified by its fluorescent signature. For example, the following combinations of Pacific Blue:Pacific Green can be utilized: 81:1, 81:3, 81:9, 81:27, 81:81, 27:1, 27:3, 27:9, 27:27, 27:81, 9:1, 9:3, 9:9, 9:27, 9:81, 3:1, 3:3, 3:9, 3:27, 3:81, 1:11, 1:3, 1:9, 1:27, 1:81. These 25 combinations can be utilized to synthesize 25 different types of microparticles that each has a unique fluorescence signature. This example illustrates the ability to resolve 5 different fluorescence intensities per channel. The ability to resolve 10 different colors per channel allows the ability to distinguish 100 microparticles for two colors and 1000 microparticles for three colors, and so on for varying numbers of fluorescence intensities. It is important that the fluorescence be stable over time and not leach from the microparticles; otherwise, the microparticles will lose their distinguishing characteristics. FIG. 5 shows the relative fluorescence units (RFUs) versus time data trace of the ratiometric hydrogel microspheres; and FIG. 6 shows the RFUs versus time data trace of ratiometric rectangular hydrogel microparticles.

One approach for the synthesis of microparticles is through the generation of microfluidic droplets. This approach utilizes a microfluidic device that is fabricated with PDMS. The PDMS device is fabricated utilizing an SU-8 master mold. The microfluidic device is fabricated by replica molding. A mixture of PDMS dprepolymer and curing agent (10:1, Sylgard 184, Dow Corning Co) is mixed, degassed, and poured onto the SU-8 master and cured at 65° C. The PDMS replica is bonded to a procured PDMS spin-coated glass slide. The dimensions of the channel are 200 µm width by 100 µm depth. The geometry of the channel is in the form where hexadecane can be utilized as the sheath to 2D focus a PEG mixture that can be utilized to form droplets. The PEG mixture has the desired functional groups for each coupling of biomolecules. The hexadecane phase has sorbitan monooleate (Span 80), a surfactant that decreases surface tension and allows for droplet formation. Microsyringe pumps (Harvard Apparatus PHD2000, USA) are utilized to precisely control the fluid flow in the continuous hexadecane/Span 80 phase and also the disperse PEG mixture phase. After droplet formation, the droplets are photopolymerized with UV light from a mercury arc lamp. The UV light is well-optimized to irradiate a specific region of the channel. By changing the Span 80 concentration, different droplet sizes can be synthesized. The microparticles are washed and resuspended in the desired reaction buffer. Droplet synthesis offers the advantages of high-throughput microparticle production. Furthermore, this approach results in highly uniform particles with a narrow distribution.

In a second method of hydrogel microparticle production, stop-flow or continuous flow lithography is utilized (Dendukuri et al., 2007; Dendukuri, Pregibon, Collins, Hatton, & Doyle, 2006). In stop-flow lithography, the PEG mixture is introduced into a microfluidic device with a straight channel, with a depth consistent with the desired particle height. With the use of a 3-way valve and an electronically controlled shutter, the flow of the PEG mixture is stopped, then the shutter opened, allowing UV light to go through a photomask to pattern the PEG prepolymer mixture. The flow is turned back on to move the polymerized particles downstream, allowing the cycle to be repeated again. The polymerization is performed on a Zeiss Axio Observer inverted microscope with a field stop position for the photomask, which is designed in AutoCAD and printed on a high-resolution printer (CAD/ART Services, OR). Exposure times are on the order of 50-100 ms, depending on the strength of the arc lamp and the number of hours on it. The stop-flow lithography approach is lower throughput than droplet formation, but offers the advantage of having different shapes for multiplexing.

Slide-based fabrication of PEG microparticles requires a UV light source and no pumps or fluidics. This is the simplest of the particle fabrication methods. The PEG prepolymer mixture is dropped onto a glass slide coated with cured PDMS. It is spread by place a PDMS-coated photomask on top of it. UV light is transmitted through the photomask at 300 mW/cm$^2$ to cure the particles. The final hydrogel particles are obtained by flushing the PDMS-coated glass slide and the photomask to release the microparticles. The particles are washed to remove any unreacted molecules from the particles and resuspended in the reaction buffer of choice.

Those skilled in the art will recognize, or be able to ascertain using no more than routine experimentation and/or engineering, many equivalents to the specific embodiments of the invention described herein. The scope of the present invention is not intended to be limited to the above Description, but rather is as set forth in the claims that follow.

The invention claimed is:

1. A method for manufacturing fluorescing hydrogel microparticles, the method comprising:
   adding at least two fluorescent dyes to a hydrogel prepolymer mixture;
   mixing the mixture so as to distribute the at least two fluorescent dyes uniformly through the prepolymer mixture; and
   applying ultraviolet light to a portion of the mixture to form a stably polymerized microparticle, such that at least one fluorescent dye does not leach from the microparticle, wherein the ratio of the at least two fluorescent dyes is selected to provide a signature for identifying the microparticle from other microparticles.

2. The method of claim 1 further comprising washing the polymerized microparticle to remove unpolymerized monomers.

3. The method of claim 1 wherein at least one of the at least two fluorescent dyes has an acrylate functional group that is compatible with the prepolymer mixture.

4. The method of claim 1 wherein at least one of the at least two fluorescent dyes is preconjugated to a high molecular weight molecule prior to addition to the prepolymer mixture.

5. The method of claim 1, wherein the at least two fluorescent dyes are covalently incorporated in the hydrogel prepolymer mixture.

6. The method of claim 1, wherein the at least two fluorescent dyes are excitable by a single excitation source.

7. The method of claim 1, wherein the fluorescence emissions of the at least two fluorescent dyes are distinct.

8. The method of claim 1 further comprising generating microfluidic droplets from the mixed solution.

9. The method of claim 1 further comprising generating at least one polymerized microparticle using stop-flow lithography.

10. The method of claim 1 further comprising generating at least one polymerized microparticle using continuous-flow lithography.

11. The method of claim 1 further comprising generating at least one polymerized microparticle using a slide-based fabrication process.

12. A mixture comprising a first microparticle and a second microparticle, wherein the first microparticle comprises:
   a hydrogel body,
   at least two fluorescent dyes uniformly dispersed throughout the entirety of the hydrogel body, wherein at least one of the at least two fluorescent dyes does not leach from the first microparticle, and wherein the ratio of the at least two fluorescent dyes provides a signature for distinguishing the first microparticle from the second microparticle.

13. The mixture of claim 12 wherein the quantities of the at least two fluorescent dyes are fixed in a predetermined ratio.

14. The mixture of claim 12 wherein the at least two fluorescent dyes are excitable by a single excitation source.

15. The mixture of claim 12 wherein the at least two fluorescent dyes have distinct fluorescence emissions.

16. The mixture of claim 12 wherein at least one fluorescent dye has an acrylate functional group that is compatible with the hydrogel.

17. The mixture of claim 12 wherein the at least one fluorescent dye is conjugated to a high molecular weight molecule.

18. The mixture of claim 12 wherein the hydrogel body is elongated.

* * * * *